Feb. 23, 1971     A. E. STRAUS     3,564,671

QUICK DISCONNECT CLAMP

Filed June 27, 1969

Inventor

ALBERT E. STRAUS

By Charles L. Lovercheck

Attorney

United States Patent Office 3,564,671
Patented Feb. 23, 1971

3,564,671
QUICK DISCONNECT CLAMP
Albert E. Straus, Erie, Pa., assignor to Morris Coupling and Clamp Company, Erie, Pa., a corporation of Pennsylvania
Filed June 27, 1969, Ser. No. 837,109
Int. Cl. B65d 63/00; F16l 55/16
U.S. Cl. 24—270                                    7 Claims

ABSTRACT OF THE DISCLOSURE

The specification discloses a coupling device of a familiar type for pipe or rigid tubing made up of a band that surrounds the pipe, a flexible sheet between the band and the pipe, and an improved clamping lever which functions in a toggle-like manner and is made up of a lever in the form of a loop. The loop is made up of a rod with two spaced parallel parts that are connected to one end of the clamp. The rod is bent back at right angles from the top spaced parts and a second rod part forming an integral handle is integral with the spaced parts. The adjacent ends of the two spaced side parts are bent at right angles in a direction opposite the handle and a rod part extends between the distal ends of the side parts forming a bearing which is received in an end of the band. When the handle lies adjacent the pipe, the two ends of the band are parallel to each other. When the handle is swung over, the two ends of the band move away from each other. One end of the band can be released by unhooking the lever and releasing the flexible sheet.

STATEMENT OF INVENTION

This invention relates to couplings and, more particularly, to couplings for joining pipe and/or tubing without the aid of any tools, and without necessarily having axial access to pipe or tubing ends.

OBJECTS OF THE INVENTION

It is an object of the invention to provide an improved coupling for pipe.

Another object is to provide a coupling or repair clamp for pipe which is simple in construction, economical to manufacture, and simple and efficient to use.

Another object is to provide a coupling or repair clamp which uses a single rod bent in the form of a loop to form a lever.

Another object of the invention is to provide a coupling which will facilitate installation and removal and which requires no special preparation of pipe or tubing ends and no special tools.

DETAILED DESCRIPTION OF THE DRAWINGS

Figure 1:
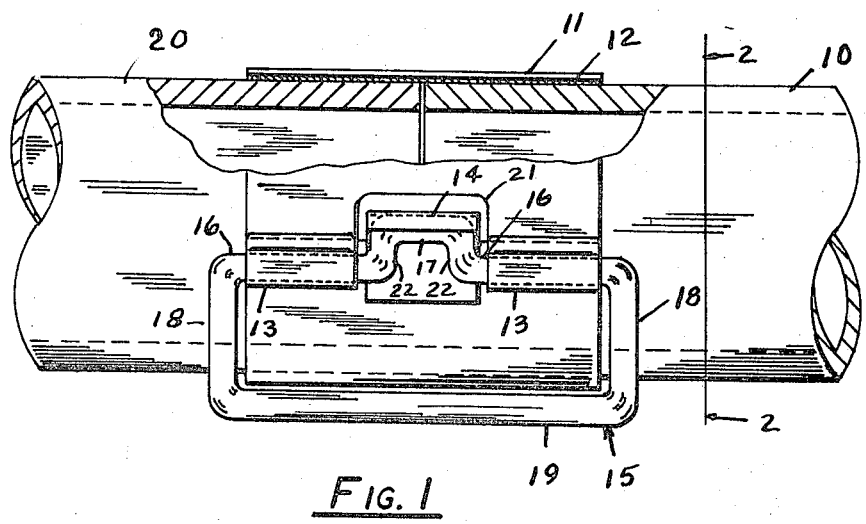
FIG. 1 is a view partly in cross section of the clamp shown connecting two pipe ends together.

Now with more particular reference to the drawings, the two pipe ends 10 and 20 are shown with their ends abutting each other and with the pipe clamp supported around them, the pipe clamp has a rigid sheet 11 and a flexible, resilient sheet 12 inside the rigid sheet, and generally coextensive with it. The resilient sheet extends entirely around the pipe and the ends thereof abut each other at 23 and 24 to form a complete seal around the pipe. The rigid sheet 11 has a notch cut out at 21 and the material at each side of the notch has an eyelet 13 formed on it which receives the bearing portion 16 of the clamping lever.

Figure 2:
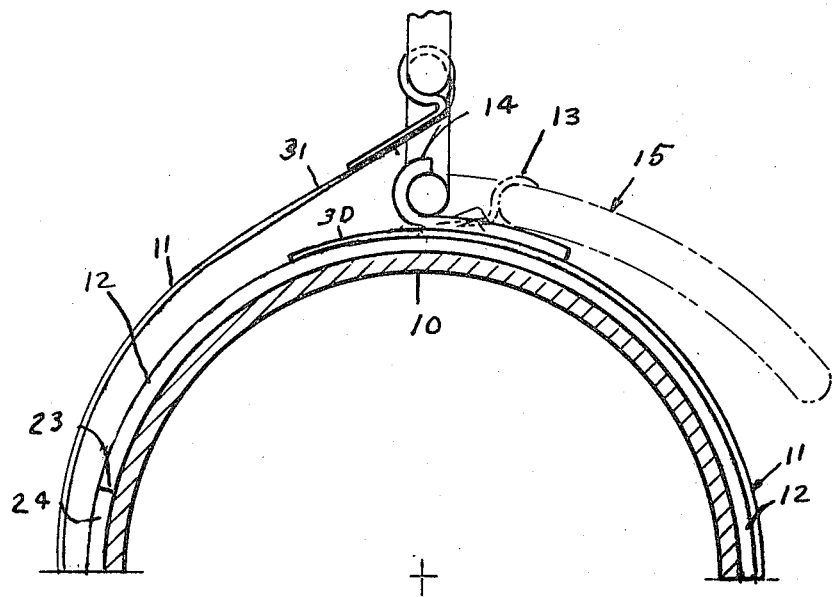
FIG. 2 is a longitudinal cross sectional view taken on line 2—2 of FIG. 1.

The material at each side of the hook 14 is removed and the hook is slightly smaller than the distance between the two eyelets 13 so that when the clamp is in clamped position, the hook 14 is attached to the second end of the sheet at a position spaced from the sheet end and the hook and extends between and is received between the eyelets 13. The lever 15 is in the form of a closed loop and it has a handle portion 19 and two parallel bearing portions 16 which are connected to the lever portions 18. The lever portions 18 are connected together at their outer end by the handle portion 19 and the second bearing portion 17 is connected to the bearing portion 16 by connecting portions 22. The handle portions 18 are curved, as indicated in FIG. 2 in the full line position, so that they fairly lie against the outside of the pipe when the clamp is in the dotted line position shown in FIG. 2, which is the clamped position. The portion 30 which extends beyond the hook 14 underlies the end 31 of sheet 11 when the clamp is closed.

Thus, to release the clamp, the handle is swung to the full line position. This unlocks the hook 14 and allows the ends of the rigid strip to be parted and the strip removed from the pipe.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A clamp comprising a sheetlike member made of relatively rigid material having a first and a second end, spaced eyelets formed on a first end of said sheet,
    a portion of said second end adjacent the center thereof extending outward beyond the side edges of said second end,
    a hook attached to said sheet on said portion adjacent said second end,
    a lever,
    said lever being made of a rod,
    said rod having two spaced parallel first bearing portions received in said eyelets,
    said rod at the outer ends of said first parallel portions being bent generally at right angles to said first portions forming a handle portion adapted to lie along the outer surface of said sheet,
    said rod being bent at the inner end of said first portion generally at right angles thereto and forming connecting portions extending in a direction generally opposite to the direction of said handle portions,
    a second portion on said rod extending generally parallel to said first portions, the ends of said connecting portions opposite said first portion being connected to the outer ends of said second bearing portion,
    said second bearing portion being adapted to be received in said hook,
    said second bearing portion forcing said hook between said spaced eyelets when said lever is swung to engage said sheet at the end thereof adjacent said hook thereby clamping said sheetlike member around said pipe.

2. The clamp recited in claim 1 wherein a sheet of resilient flexible material is disposed on the inside surface of said sheetlike member,
    said sheetlike member being adapted to be tensioned by said rod whereby said flexible member is clamped in intimate contact with the outer periphery of said pipe.

3. The clamp recited in claim 1 wherein said eyelets are formed by the material of said sheet being bent back on itself.

4. The clamp recited in claim 1 wherein a portion of said sheet material is removed adjacent the center of said first end having two spaced portions and the material of said eyelets are formed by bending said sheet at each side of said removed portion.

5. The clamp recited in claim 4 wherein the material of said sheet at said second end is removed at each side of said hook,
and said hook is substantially the same width as the space between said eyelets.

6. The clamp recited in claim 5 wherein the handle parts are bent to conform to the outer periphery of said pipe when said clamp is in clamped position.

7. The clamp recited in claim 1 wherein said portion of said second end extends beyond said hook a substantial distance,
said portion of said second end underlying said first end when said sheet is in clamped position.

References Cited
UNITED STATES PATENTS

| | | | |
|---|---|---|---|
| 207,470 | 8/1878 | Wolf | 24—270 |
| 948,772 | 2/1910 | Shepard | 138—99 |

FOREIGN PATENTS

| | | | |
|---|---|---|---|
| 633,602 | 10/1927 | France | 24—270 |
| 63,911 | 8/1892 | Germany | 138—99 |

DONALD A. GRIFFIN, Primary Examiner

U.S. Cl. X.R.

138—99